US012687281B2

(12) United States Patent
Li et al.

(10) Patent No.: US 12,687,281 B2
(45) Date of Patent: Jul. 21, 2026

(54) QUICK CONNECTION STRUCTURE AND CEILING LAMP

(71) Applicants: SUZHOU OPPLE LIGHTING CO., LTD., Suzhou City (CN); OPPLE LIGHTING CO., LTD., Shanghai (CN)

(72) Inventors: Ying Li, Suzhou City (CN); Lei Yan, Suzhou City (CN)

(73) Assignees: SUZHOU OPPLE LIGHTING CO., LTD., Suzhou City (CN); OPPLE LIGHTING CO., LTD., Shanghai (CN)

( * ) Notice: Subject to any disclaimer, the term of this patent is extended or adjusted under 35 U.S.C. 154(b) by 257 days.

(21) Appl. No.: 18/596,768

(22) Filed: Mar. 6, 2024

(65) Prior Publication Data

US 2024/0295309 A1 Sep. 5, 2024

Related U.S. Application Data

(63) Continuation of application No. PCT/CN2022/112939, filed on Aug. 17, 2022.

(30) Foreign Application Priority Data

Sep. 29, 2021 (CN) .......................... 202111147423.2
Sep. 29, 2021 (CN) ......................... 202122369500.0

(51) Int. Cl.
*F21V 21/03* (2006.01)
*F21S 8/04* (2006.01)
(Continued)

(52) U.S. Cl.
CPC ................ *F21V 21/03* (2013.01); *F21S 8/04* (2013.01); *F21V 1/04* (2013.01); *F21V 23/06* (2013.01)

(58) Field of Classification Search
CPC . F21V 21/03; F21V 1/04; F21V 23/06; F21V 17/14; F21S 8/04
See application file for complete search history.

(56) References Cited

U.S. PATENT DOCUMENTS 10,816,163 B1 * 10/2020 Hsu ......................... F21V 13/04
2006/0108137 A1 * 5/2006 Smith .................... H01R 33/46 174/50

(Continued)

FOREIGN PATENT DOCUMENTS

CN 207527424 U 6/2018
CN 207599436 U 7/2018

(Continued)

OTHER PUBLICATIONS

International Search Report of PCT Application No. PCT/CN2022/112939, dated Oct. 8, 2022 with English translation, (10p).

*Primary Examiner* — Christopher E Dunay
(74) *Attorney, Agent, or Firm* — Arch & Lake LLP; Hao Tan; Shen Wang

(57) ABSTRACT

A ceiling lamp is provided by the present disclosure, and the ceiling lamp includes a quick connection structure and a lamp body, the quick connection structure is configured to connect the lamp body to a mounting surface, the quick connection structure is in a circular shape, and an edge of the quick connection structure is formed with a first annular wall extending towards the lamp body, the lamp body is provided with a second annular wall extending towards the quick connection structure, and the second annular wall is provided on an inner side of the first annular wall, the quick connection structure is provided with a first limiting member, an inner wall of the second annular wall is provided with a second limiting member for cooperating with the first limiting member.

11 Claims, 5 Drawing Sheets

(51) Int. Cl.
*F21V 1/04* (2006.01)
*F21V 23/06* (2006.01)

(56) References Cited

U.S. PATENT DOCUMENTS

| | | | | |
|---|---|---|---|---|
| 2009/0135598 | A1* | 5/2009 | Amos | F21S 8/033 362/249.01 |
| 2011/0291594 | A1* | 12/2011 | Tanaka | F21V 29/773 362/362 |
| 2017/0009962 | A1* | 1/2017 | Feit | F21S 8/043 |
| 2017/0234513 | A1* | 8/2017 | Tang | F21S 8/033 362/368 |
| 2021/0010662 | A1* | 1/2021 | Dixit | F21S 8/04 |

FOREIGN PATENT DOCUMENTS

| | | | |
|---|---|---|---|
| CN | 209726005 | U | 12/2019 |
| CN | 113124353 | A | 7/2021 |
| CN | 113775984 | A | 12/2021 |
| JP | 2015076390 | A | 4/2015 |

* cited by examiner

QUICK CONNECTION STRUCTURE AND CEILING LAMP

CROSS-REFERENCE TO RELATED APPLICATIONS

This application is based upon and claims the priority of PCT patent application No. PCT/CN2022/112939 filed on Aug. 17, 2022 which claims priority to the Chinese patent application No. 202111147423.2 filed on Sep. 29, 2021 and the Chinese patent application No. 202122369500.0 filed on Sep. 29, 2021, the entire contents of which are hereby incorporated by reference herein for all purposes.

TECHNICAL FIELD

The present disclosure relates to a quick connection structure and a ceiling lamp, which belong to a lighting technical field.

BACKGROUND

Ceiling lamps generally require users to assemble lampshades and lampshells of the ceiling lamps, which is time-consuming and laborious during installation, causing inconvenience to users. In addition, the sealing of the lamps is easily affected by non-standard user operations and objective conditions of the installation environment during actual use, resulting in poor sealing of the lamps and affecting the luminous effect of the lamps, thus unable to fundamentally solve the problem of mosquito and dust invasion.

Thus, it is necessary to propose improvements to the quick connection structure and ceiling lamps.

SUMMARY

The present disclosure provides a quick connection structure and a ceiling lamp.

The present disclosure provides a ceiling lamp, and the ceiling lamp may include a quick connection structure and a lamp body, the quick connection structure may be configured to connect the lamp body to a mounting surface, the quick connection structure may be in a circular shape, and an edge of the quick connection structure may be formed with a first annular wall extending towards the lamp body. The lamp body may be provided with a second annular wall extending towards the quick connection structure, and the second annular wall may be provided on an inner side of the first annular wall, the quick connection structure may be provided with a first limiting member, an inner wall of the second annular wall may be provided with a second limiting member for cooperating with the first limiting member, in a case that the quick connection structure covers an outer side of the second annular wall, the lamp body may be rotated to drive the first limiting member to cooperate with the second limiting member to install the lamp body on the quick connection structure.

The present disclosure further provides a quick connection structure, and the quick connection structure may be configured to connect a lamp body to a mounting surface, the lamp body may be provided with a second limiting member, in which the quick connection structure may be in a circular shape, an edge of the quick connection structure may be formed with a first annular wall extending towards the lamp body, the quick connection structure may be provided with a first limiting member, and the lamp body may be rotated to drive the first limiting member to cooperate with the second limiting member to install the lamp body on the quick connection structure.

It is to be understood that both the foregoing general description and the following detailed description are exemplary and explanatory only and are not restrictive of the present disclosure.

DETAILED DESCRIPTION

In order to make the purpose, technical solutions, and advantages of the present disclosure clearer, a detailed description of the present disclosure will be provided below in conjunction with the accompanying drawings and examples.

It should be noted that in order to avoid blurring the present disclosure due to unnecessary details, only the structure and/or processing steps closely related to the object of the present disclosure are shown in the accompanying drawings, and other details that are not closely related to the present disclosure are omitted.

In addition, it should be noted that the terms “comprise”, “comprising”, “include”, “including”, or any other variant are intended to encompass non exclusive inclusion, such that a process, a method, an item, or a device that includes a series of elements not only includes those elements, but also other elements that are not explicitly listed, or also include elements inherent to such a process, a method, an item, or a device.

As shown in FIG. 1 to FIG. 7, the present disclosure discloses a ceiling lamp 100, the ceiling lamp 100 is provided with a quick connection structure 10 for mounting on a mounting surface. The quick connection structure 10 can connect different lamps to meet the different requirements of users, and there is no limitation here. For clarity, the following section of the specification will provide a detailed illustration of the specific structure of the ceiling lamp 100.

Figure 1:
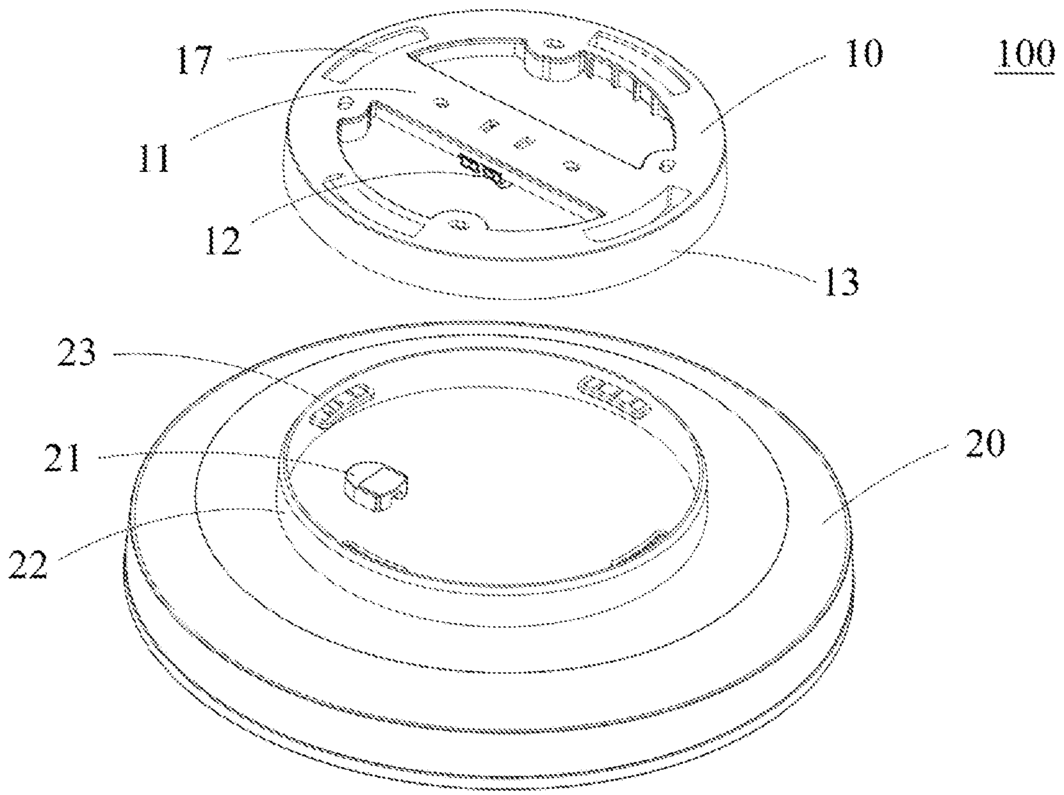
FIG. 1 is a decomposition schematic diagram of a ceiling lamp according to an example of the present disclosure.

As shown in FIG. 1, the ceiling lamp 100 includes a quick connection structure 10 and a lamp body 20. The quick connection structure 10 is in a circular shape, and one side of the quick connection structure 10 is fixed on a mounting surface, the other side of the quick connection structure 10 is configured to install the lamp body 20. The quick connection structure 10 is provided with a connector 11 that is radially arranged, the connector 11 is configured to be connected with an inner side of the quick connection structure 10 to enhance the strength of the quick connection structure 10, and a gap is reserved on two sides of the connector 11 for the lamp body 20 to dissipate heat. The width of the connector 11 can be set as needed, which is not limited herein.

The connector 11 is provided with a wiring terminal 12, the wiring terminal 12 has a first end facing the mounting surface and a second end facing the lamp body 20. The first end and the second end are electrically conductive, and the first end of the wiring terminal 12 is configured to be connected with a wire of the mounting surface, and the second end of the wiring terminal 12 is configured to be connected with a wire of a connection port 21 of the lamp body 20 (not shown). It can be understood that the second end of the wiring terminal 12 can be detachably connected to the connection port 21 of the lamp body 20 for easy installation and disassembly. The second end of the wiring terminal 12 includes but is not limited to a press type structure or a locking type structure. It can be understood that during the installation process of the ceiling lamp 100, only the quick connection structure 10 needs to be pre-installed and the wire of the installation surface needs to be connected to quickly install the lamp body 20.

Figure 2:
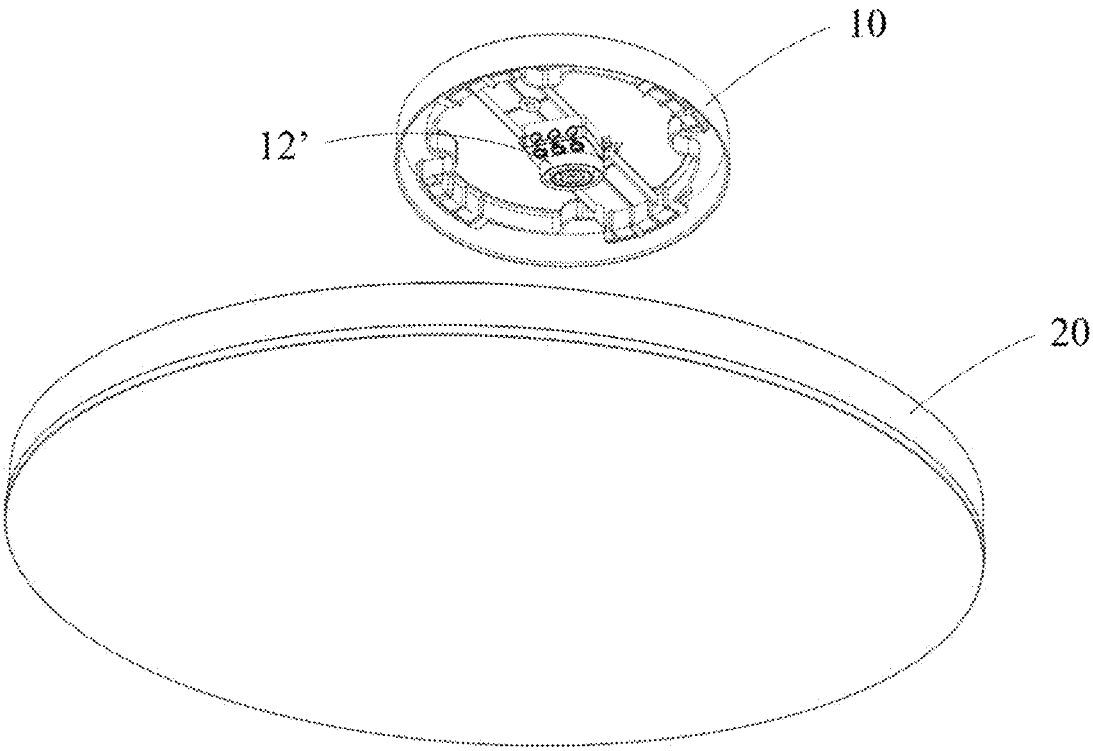
FIG. 2 is a schematic diagram of an electrical connection of a ceiling lamp according to an example of the present disclosure.
Figure 3:
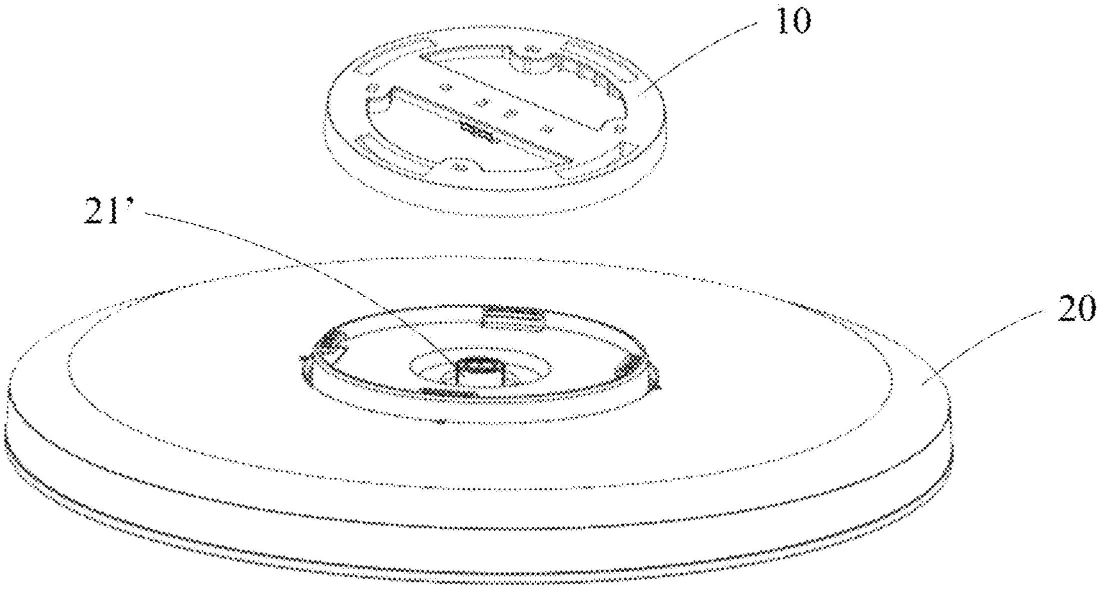
FIG. 3 is a schematic diagram from another perspective of an electrical connection of a ceiling lamp according to an example of the present disclosure.

As shown in FIG. 2 and FIG. 3, in another example of the present disclosure, the wiring terminal 12' and the connection port 21' can also be electrically connected using the structure of an electrical connector. In this way, there is no need to set a wire between the wiring terminal 12' and the connection port 21', which is not limited herein, as long as it is easy to install and disassemble.

Specifically, an edge of the quick connection structure 10 is formed with a first annular wall 13 extending towards the lamp body 20, and the lamp body 20 is provided with a second annular wall 22 extending towards the quick connection structure 10. The first annular wall 13 is opposite to the second annular wall 22, and the second annular wall 22 is located on an inner side of the first annular wall 13, that is, the quick connection structure 10 covers an outer side of the second annular wall 22.

In another example of the present disclosure, the first annular wall 13 and the second annular wall 22 can be tightly combined to prevent loosening, which can be set as needed, which is not limited herein. In other examples of the present disclosure, there may be a mutually matched threaded structure between the first annular wall 13 and the second annular wall 22 to enable the lamp body 20 to be securely connected to the quick connection structure 10 through rotation, which is not limited herein.

Figure 6:
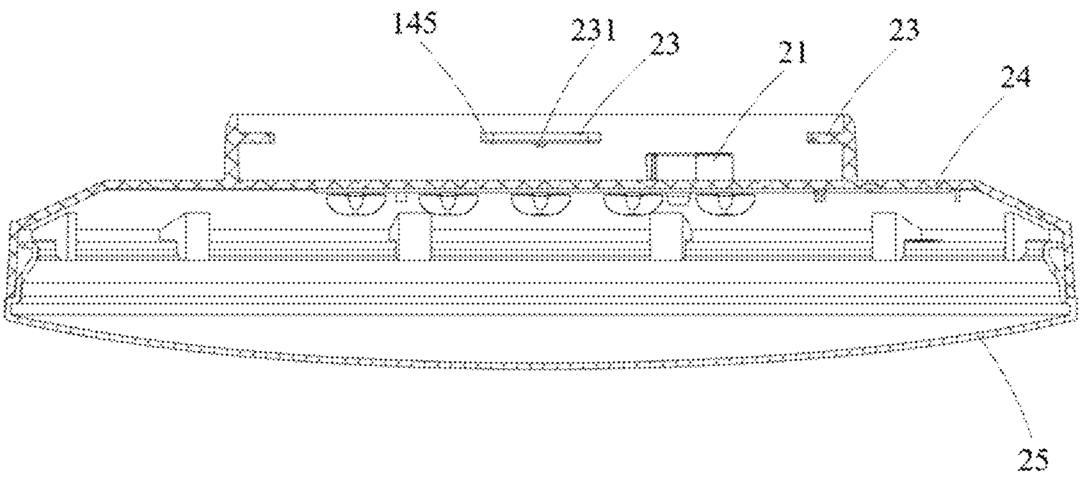
FIG. 6 is a cross-sectional schematic diagram of a ceiling lamp according to an example of the present disclosure.
Figure 7:
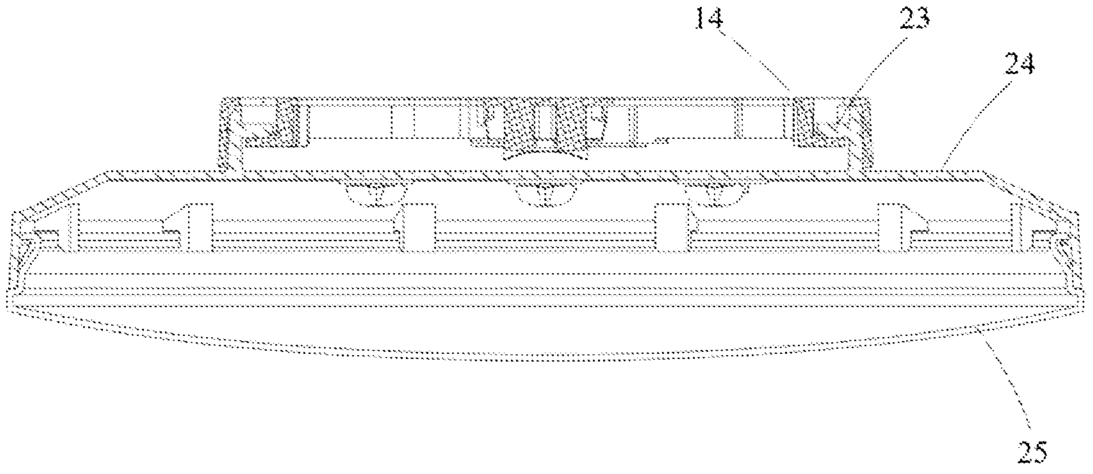
FIG. 7 is a cross-sectional schematic diagram from another perspective of a ceiling lamp according to an example of the present disclosure.

As shown in FIG. 6 and FIG. 7, preferably, the lamp body 20 includes a lampshell 24 and a lampshade 25, the lamp lampshell 24 is sealed and assembled with the lampshade 25, so that the lamp body 20 can achieve integrated sealing, and therefore users only need to assemble the lamp body 20 with the quick connection structure 10.

Figure 4:
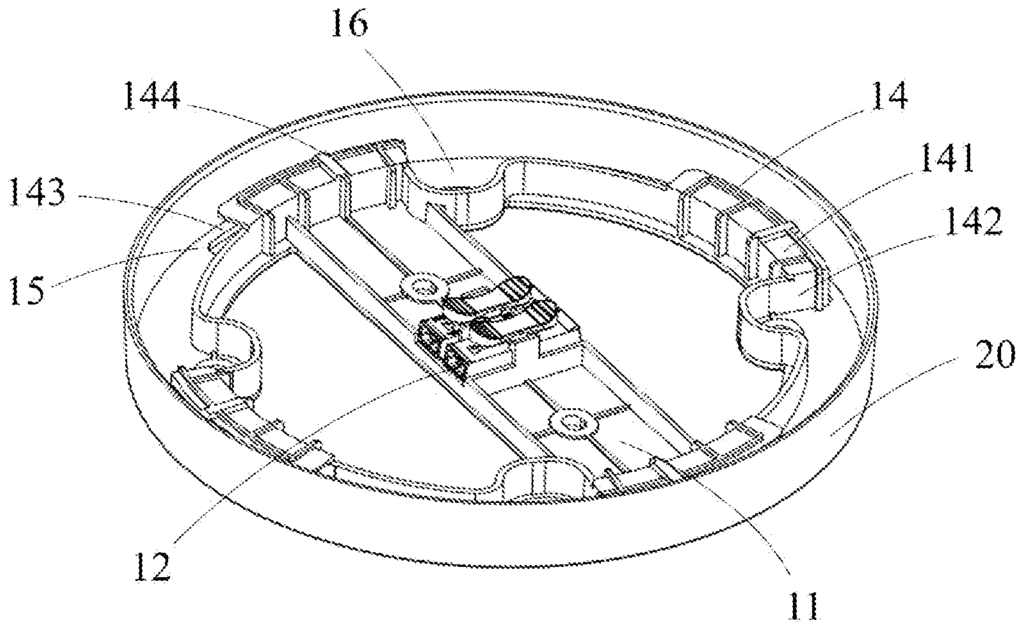
FIG. 4 is a schematic diagram of a quick structure of a ceiling lamp according to an example of the present disclosure.

As shown in FIG. 4, further, the quick connection structure 10 is provided with a first limiting member 14, the first limiting member 14 includes a bearing portion 141 and a stop portion 142, and the bearing portion 141 and the stop portion 142 are enclosed to form an accommodating chamber 143, the accommodating chamber 143 is provided with an opening that is horizontally oriented, the opening and the stop portion 142 are respectively located on both sides of the bearing portion 141. The inner wall of the second annular wall 22 is provided with a second limiting member 23 for cooperating with the first limiting member 14. The second limiting member 23 includes but is not limited to a block shape or a strip shape, and the second limiting member 23 can enter the accommodating chamber 143 from the opening to be accommodated in the accommodating chamber 143. The bearing portion 141 is configured to carry the second limiting member 23, that is, carry the weight of the lamp body 20, and the stop portion 142 is configured to prevent the second limiting member 23 from excessive rotation. In a case that the quick connection structure 10 covers the outer side of the second annular wall 22, the first limiting member 14 and the second limiting member 23 are driven to cooperate with each other by rotating the lamp body 20, to install the lamp body 20 on the quick connection structure 10. In other examples of the present disclosure, reinforcing ribs may be provided on the side edges of the bearing portion 141 and the stop portion 142, or the bearing portion 141 and the stop portion 142 may be integrally formed or embedded in the quick connection structure 10, which is not limited herein.

As an example of the present disclosure, the bearing portion 141 is not horizontally arranged, that is, the bearing portion 141 is higher at the opening and lower at the stop portion 142, in this way, the second limiting member 23 has a tendency to move towards the stop portion 142 in the accommodating chamber 143 under the action of gravity, to prevent accidental detachment of the lamp body 20.

Figure 5:
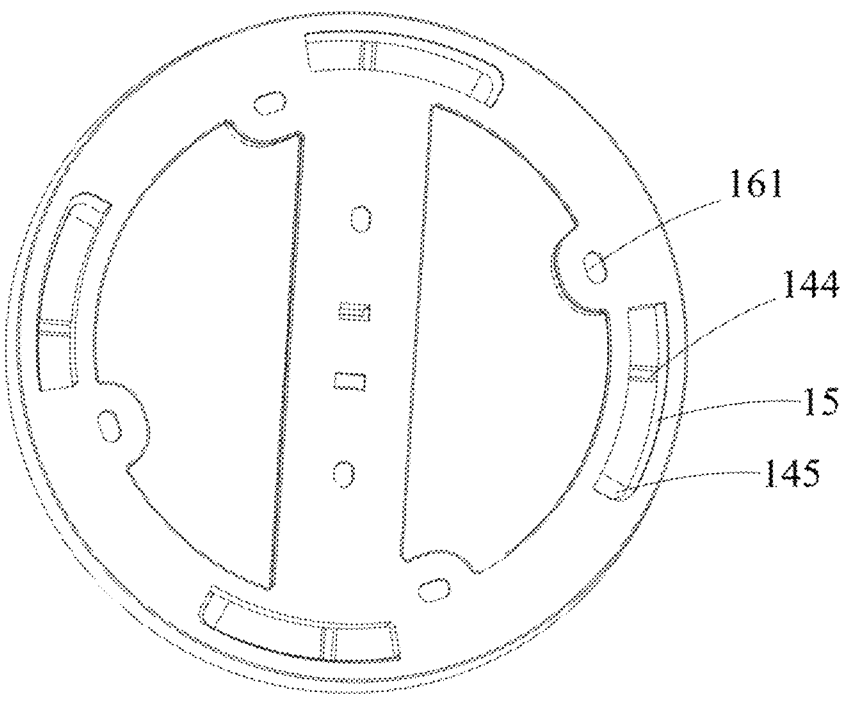
FIG. 5 is a schematic diagram from another perspective of a quick structure of a ceiling lamp according to an example of the present disclosure.

As shown in FIG. 4 and FIG. 5, specifically, an annular groove 15 is formed between the first annular wall 13 and the first limiting member 14 for the rotation of the second annular wall 22. As the second limiting member 23 is connected to the inner wall of the second annular wall 22, a corresponding sliding groove (not shown) for the sliding of the second limiting member 23 can be opened on the side of the accommodating chamber 143 facing the first annular wall 13, and the sliding groove is connected to the opening.

The annular groove 15 extends towards a radial direction of the quick connection structure 10 to form an installation portion 16, the installation portion 16 is provided with an installation hole 161 and an installation member (not shown). The installation member passes through the installation hole 161 to install the quick connection structure 10 on the mounting surface. The installation hole 161 and the installation member include but are not limited to a bolt and a screw hole, and the installation portion 16 is arranged close to the stop portion 142.

In an example of the present disclosure, at least two first limiting members 14 are provided, preferably, four first limiting members 14 are provided, and the four first limiting members 14 are uniformly distributed on the quick connection structure 10. Correspondingly, four second limiting members 23 and four installation portions 16 are provided, thereby enhancing the bearing capacity of the bearing portion 141 on the lamp body 20 and enhancing the stability of the structure. It can be understood that the larger the contact area between the first limiting member 14 and the second limiting member 23, the more stable the connection between the lamp body 20 and the quick connection structure 10. Specific arrangements can be made as needed, which is not limited herein.

As shown in FIG. 5, in an example of the present disclosure, the second limiting member 23 is provided with a stop rib 231 that is protruding, and a stop groove 144 is correspondingly provided in the accommodating chamber 143 to accommodate the stop rib 231. In a case that the second limiting member 23 enters the accommodating chamber 143 from the opening, the stop rib 231 slides into the stop groove 144 to fix the relative position of the lamp body 20 relative to the quick connection structure 10.

Specifically, the stop rib 231 may be provided at the lower end of the second limiting member 23, and the stop groove 144 may be provided on the bearing portion 141. In other examples of the present disclosure, the stop rib 231 and the stop groove 144 may also be provided on the side or above of the second limiting member 23. Of course, it can be understood that the stop groove 144 may be provided on the second limiting member 23, and the stop rib 231 may be provided in the accommodating chamber 143. The specific connection structure between the second limiting member 23 and the accommodating chamber 143 includes but is not limited to an elastic structure, as long as it is easy to install and disassemble, which is not limited herein.

Preferably, a guiding inclined surface 145 is provided on the second limiting member 23, the guiding inclined surface 145 is oriented towards the opening to insert the second limiting member 23 into the accommodating chamber 143 from the opening. In this case, the guiding inclined surface 145 can be used to indicate the correct installation direction and prevent incorrect installation.

The quick connection structure 10 is provided with a through hole 17 that communicates with the accommodating chamber 143. The through hole 17 can be used for heat dissipation of the lamp body 20, while reducing the frictional force between the upper end of the second limiting member 23 and the corresponding position of the lower end of the quick connection structure 10.

In summary, the quick connection structure 10 provided by the present disclosure can provide an installation platform for different lamps, which is convenient for installation and disassembly. At the same time, the lamp body 20 is an integrated sealed assembly to avoid the invasion of mosquitoes and dust.

The present disclosure is to provide a quick connection structure and a ceiling lamp, which facilitate installation and disassembly.

The present disclosure provides a ceiling lamp, the ceiling lamp comprises a quick connection structure and a lamp body, the quick connection structure is configured to connect the lamp body to a mounting surface, the quick connection structure is in a circular shape, and an edge of the quick connection structure is formed with a first annular wall extending towards the lamp body, the lamp body is provided with a second annular wall extending towards the quick connection structure, and the second annular wall is provided on an inner side of the first annular wall, the quick connection structure is provided with a first limiting member, an inner wall of the second annular wall is provided with a second limiting member for cooperating with the first limiting member, in a case that the quick connection structure covers an outer side of the second annular wall, the lamp body is rotated to drive the first limiting member to cooperate with the second limiting member to install the lamp body on the quick connection structure.

As a further improvement of the present disclosure, an annular groove is provided between the first annular wall and the first limiting member for rotation of the second annular wall, the first limiting member comprises a bearing portion for carrying the second limiting member and a stop portion for preventing excessive rotation of the second limiting member, the bearing portion and the stop portion are enclosed to form an accommodating chamber for accommodating the second limiting member.

As a further improvement of the present disclosure, the second limiting member is provided with a stop rib that is protruding, and a stop groove is correspondingly provided in the accommodating chamber for accommodating the stop rib.

As a further improvement of the present disclosure, the second limiting element is provided with a guiding inclined surface to facilitate inserting the second limiting element into the accommodating chamber.

As a further improvement of the present disclosure, the bearing portion is not horizontally arranged to enable the second limiting member to have a tendency to move towards the stop portion in the accommodating chamber.

As a further improvement of the present disclosure, the quick connection structure is provided with a through hole for communicating with the accommodating chamber.

As a further improvement of the present disclosure, the annular groove extends towards a radial direction of the quick connection structure to form an installation portion, the installation portion is provided with a mounting hole and a mounting member, the mounting member passes through the mounting hole to install the quick connection structure on the mounting surface.

As a further improvement of the present disclosure, at least two first limiting members are provided, and the installation portion is provided close to the stop portion.

As a further improvement of the present disclosure, the quick connection structure is provided with a connector that is radially arranged, the connector is configured to be connected with the inner side of the first annular wall, the connector is provided with a wiring terminal, one end of the wiring terminal is configured to be connected with a wire of the mounting surface, and the other end of the wiring terminal is configured to be electrically connected with the lamp body.

As a further improvement of the present disclosure, the lamp body comprises a lampshell and a lampshade, and the lampshell is sealed and assembled with the lampshade.

The present disclosure further provides a quick connection structure, configured to connect a lamp body to a mounting surface, the lamp body being provided with a second limiting member, in which the quick connection structure is in a circular shape, an edge of the quick connection structure is formed with a first annular wall extending towards the lamp body, the quick connection structure is provided with a first limiting member, and the lamp body is rotated to drive the first limiting member to cooperate with the second limiting member to install the lamp body on the quick connection structure.

As a further improvement of the present disclosure, an annular groove is provided between the first annular wall and the first limiting member, the first limiting member comprises a bearing portion for carrying the second limiting member and a stop portion for preventing excessive rotation of the second limiting member, the bearing portion and the stop portion are enclosed to form an accommodating chamber for accommodating the second limiting member.

As a further improvement of the present disclosure, the quick connection structure is provided with a connector that is radially arranged, the connector is configured to be connected with the inner side of the first annular wall, the connector is provided with a wiring terminal, one end of the wiring terminal is configured to be connected with a wire of the mounting surface, and the other end of the wiring terminal is configured to be electrically connected with the lamp body.

The beneficial effect of the present disclosure is that the quick connection structure provided by the present disclosure can provide an installation platform for different lamps, which is convenient for installation and disassembly, and at the same time, the lamp body is an integrated sealed assembly, thereby avoiding the invasion of mosquitoes and dust.

The above examples are only used to illustrate the technical solutions of the present disclosure and not to limit the present disclosure. Although the present disclosure has been described in detail with reference to examples, ordinary technical personnel in the art should understand that modifications or equivalent replacements can be made to the technical solutions of the present disclosure without departing from the spirit and scope of the technical solutions of the present disclosure.

The invention claimed is:

1. A ceiling lamp, comprising:

a quick connection structure and a lamp body, wherein:

the quick connection structure is configured to connect the lamp body to a mounting surface, the quick connection structure is in a circular shape, and an edge of the quick connection structure is formed with a first annular wall extending towards the lamp body, the lamp body is provided with a second annular wall extending towards the quick connection structure, and the second annular wall is provided on an inner side of the first annular wall, the quick connection structure is provided with a first limiting member, an inner wall of the second annular wall is provided with a second limiting member configured to cooperate with the first limiting member, in response to the quick connection structure covering an outer side of the second annular wall, the lamp body is rotated to drive the first limiting member to cooperate with the second limiting member to install the lamp body on the quick connection structure, wherein an annular groove is provided between the first annular wall and the first limiting member, the annular groove being configured to allow rotation of the second annular wall, wherein the first limiting member comprises a bearing portion configured to carry the second limiting member and a stop portion configured to prevent excessive rotation of the second limiting member, and wherein the bearing portion and the stop portion are enclosed to form an accommodating chamber configured to accommodate the second limiting member.

2. The ceiling lamp according to claim 1, wherein the second limiting member is provided with a stop rib that is protruding, and a stop groove is correspondingly provided in the accommodating chamber for accommodating the stop rib.

3. The ceiling lamp according to claim 1, wherein the second limiting element is provided with a guiding inclined surface to facilitate inserting the second limiting element into the accommodating chamber.

4. The ceiling lamp according to claim 1, wherein the bearing portion is not horizontally arranged to enable the second limiting member to have a tendency to move towards the stop portion in the accommodating chamber.

5. The ceiling lamp according to claim 1, wherein the quick connection structure is provided with a through hole for communicating with the accommodating chamber.

6. The ceiling lamp according to claim 1, wherein the annular groove extends towards a radial direction of the quick connection structure to form an installation portion, the installation portion is provided with a mounting hole and a mounting member, the mounting member passes through the mounting hole to install the quick connection structure on the mounting surface.

7. The ceiling lamp according to claim 6, wherein at least two first limiting members are provided, and the installation portion is provided close to the stop portion.

8. The ceiling lamp according to claim 1, wherein the quick connection structure is provided with a connector that is radially arranged, the connector is configured to be connected with the inner side of the first annular wall, the connector is provided with a wiring terminal, one end of the wiring terminal is configured to be connected with a wire of the mounting surface, and the other end of the wiring terminal is configured to be electrically connected with the lamp body.

9. The ceiling lamp according to claim 1, wherein the lamp body comprises a lampshell and a lampshade, and the lampshell is sealed and assembled with the lampshade.

10. A quick connection structure, wherein:

the quick connection structure is configured to connect a lamp body to a mounting surface, the lamp body is provided with a second limiting member, wherein the quick connection structure is in a circular shape, an edge of the quick connection structure is formed with a first annular wall extending towards the lamp body, the lamp body is provided with a second annular wall extending towards the quick connection structure, and the second annular wall is provided on an inner side of the first annular wall, the quick connection structure is provided with a first limiting member, an inner wall of the second annular wall is provided with a second limiting member configured to cooperate with the first limiting member; in response to the quick connection structure covering an outer side of the second annular wall, the lamp body is rotated to drive the first limiting member to cooperate with the second limiting member to install the lamp body on the quick connection structure, wherein an annular groove is provided between the first annular wall and the first limiting member, the annular groove being configured to allow rotation of the second annular wall, wherein the first limiting member comprises a bearing portion configured to carry the second limiting member and a stop portion configured to prevent excessive rotation of the second limiting member, and wherein the bearing portion and the stop portion are enclosed to form an accommodating chamber configured to accommodate the second limiting member.

11. The quick connection structure according to claim 10, wherein the quick connection structure is provided with a connector that is radially arranged, the connector is configured to be connected with the inner side of the first annular wall, the connector is provided with a wiring terminal, one end of the wiring terminal is configured to be connected with a wire of the mounting surface, and the other end of the wiring terminal is configured to be electrically connected with the lamp body.

* * * * *